United States Patent [19]
Petersen

[11] 3,992,978
[45] Nov. 23, 1976

[54] FLUID MOTOR AND FLUID CONTROL MEANS THEREFORE

[75] Inventor: Niel R. Petersen, Hopkins, Minn.

[73] Assignee: MTS Systems Corporation, Minneapolis, Minn.

[22] Filed: June 23, 1975

[21] Appl. No.: 589,382

Related U.S. Application Data

[62] Division of Ser. No. 470,631, May 16, 1974, Pat. No. 3,921,286.

[52] U.S. Cl. .................. 91/47; 91/376 R; 91/390; 91/394; 92/85 B
[51] Int. Cl.² .............. F15B 13/16; F15B 9/10; F01B 11/02
[58] Field of Search ............ 91/390, 49, 47, 394, 91/376; 92/85 B

[56] References Cited
UNITED STATES PATENTS

| | | | |
|---|---|---|---|
| 1,449,736 | 3/1923 | Degen | 91/49 |
| 3,496,833 | 2/1970 | Kobelt | 91/49 |
| 3,757,640 | 9/1973 | Karol | 91/49 |

Primary Examiner—Paul E. Maslousky
Attorney, Agent, or Firm—Dugger, Johnson & Westman

[57] ABSTRACT

A pressure balanced hydrostatic slip bearing as shown for use in guiding and restraining a test table which is shaken in longitudinal direction to vibrate or shake test objects, and also which may be shaken in vertical direction. The slip bearing controls lateral position of the table during operation. A second slip bearing applies a constant compressive preload force to one side of the table and the other pressure balanced bearing is a constant displacement bearing positioned on an opposite side of the table to react lateral forces which may be imposed on the table during operation.

1 Claim, 5 Drawing Figures

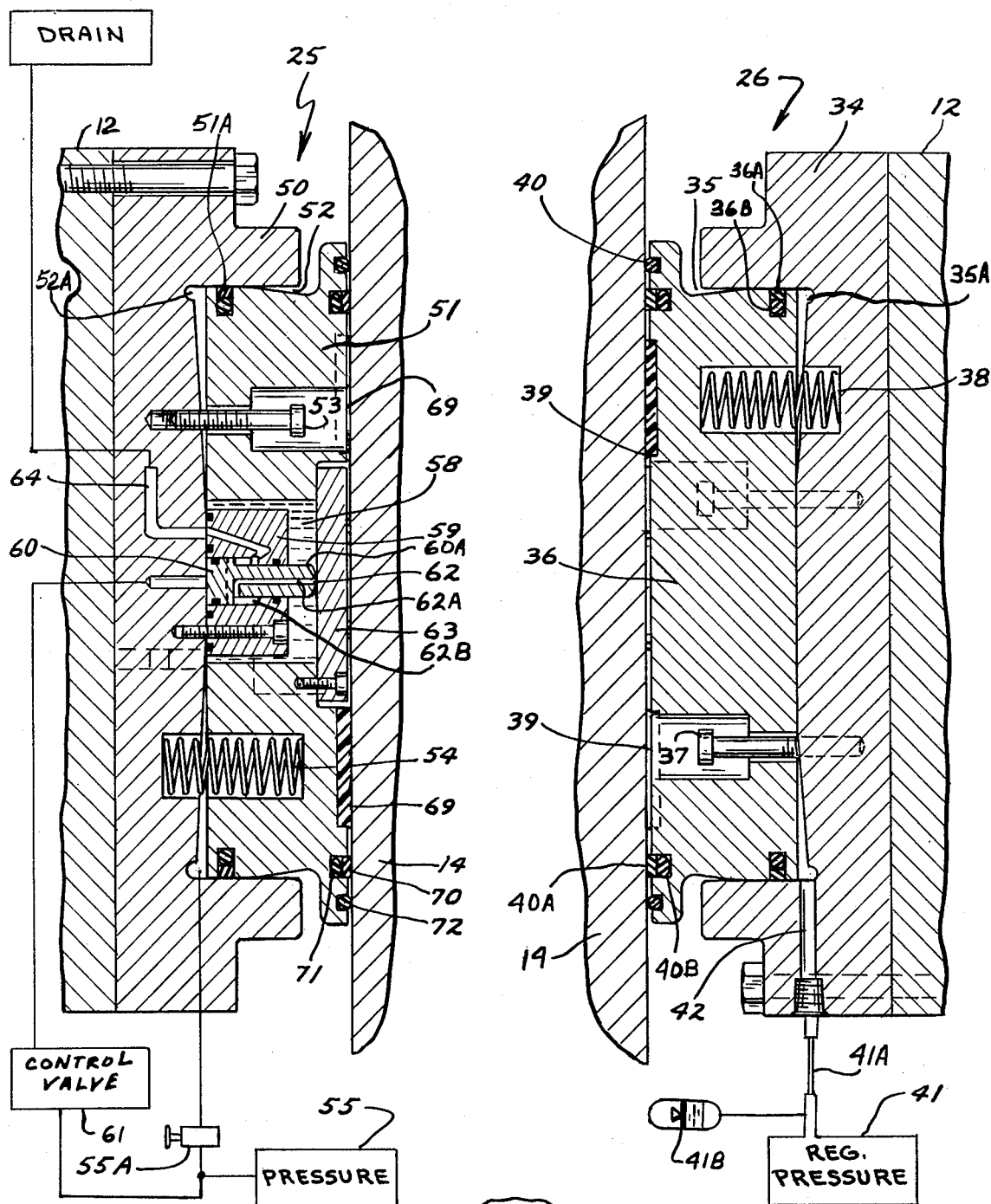

FLUID MOTOR AND FLUID CONTROL MEANS THEREFORE

This is a division of application Ser. No. 470,631, filed May 16, 1974, now U.S. Pat. No. 3,921,286.

BACKGROUND OF THE INVENTION

1. Field of the Invention

The present invention relates to pressure balanced slip bearings used in guide and restraint systems.

2. Prior Art

In the prior art various types of slip bearings or guides for movable members such as tables have been devised. U.S. Pat. No. 3,224,244 shows an air centering device for vibration or shaker tables, and U.S. Pat. No. Re. 24,816 relates to the fluid support for a high frequency vibration table.

U.S. Pat. No. 2,738,625 also shows a mechanical arrangement used for supporting a table for movement with sliding supports on the opposite sides of the table.

U.S. Pat. No. 3,014,765 in FIG. 5, shows a restraint or guide that has a valve actuated in response to deflection of a member to provide forces to resist such deflection.

Further, hydrostatic slip bearings which permit some angular deflection of the members have been advanced. In one such prior device a seal that accommodates some relative movement is used against the surface being guided. The slip bearing has a part spherical member that can tilt while the seal for the hydrostatic bearing is maintained.

SUMMARY OF THE INVENTION

The present invention relates to a pressure balanced hydrostatic slip bearing and use of such a bearing in a restraint system for a test table which must shake structures mounted on the table for testing purposes. The pressure balanced slip bearing comprises a variable compression load actuator which tends to return to an original position, thus tending to restore itself to a known displacement. When used in combination with an opposing constant compression force actuator in a restraint system the actuators together resist and carry any lateral forces which may be externally applied to the table during testing. The hydrostatic slip bearing guide members disclosed slidably engage the sides of the table to permit movement in both longitudinal and vertical directions. Other multi axial combinations of such bearing components can also be used for constraining table motion in any desired number of degrees of freedom.

The slip bearings are provided with springs which will initially load sliding seals used with the slip bearings during system start up.

The pressure balanced bearing comprises a hydraulic actuator that has a self controlled bleed orifice or exhaust port which adjusts upon any shifts in displacement of the actuator to restore the unit to its original displacement. The means forming the orifice also is made so that it will retract when the actuator collapses to prevent damage to the system.

BRIEF DESCRIPTION OF THE DRAWINGS

FIG. 3 is a sectional view taken as on line 3—3 in FIG. 1 showing the construction of a constant displacement, pressure balanced hydrostatic slip bearing guide member;

FIG. 4 is a sectional view taken as on line 4—4 in FIG. 1 showing the construction of a constant force hydrostatic slip bearing guide member; and FIG. 5 is a fragmentary detail view of a drain orifice arrangement of the constant displacement guide member in a working position.

DESCRIPTION OF THE PREFERRED EMBODIMENT

Figure 1:
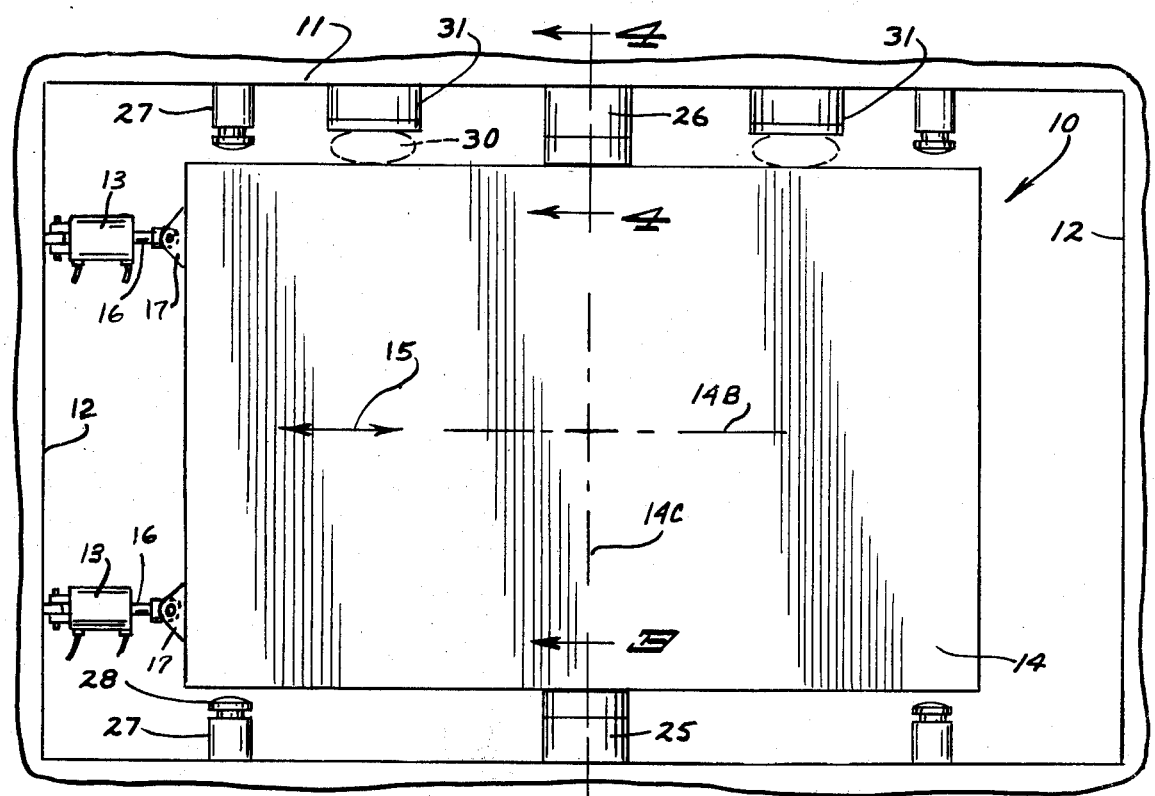
FIG. 1 is a schematic top plan view of a shaker table utilizing hydrostatic slip bearings made according to the present invention for guide and restraint.

Referring to FIG. 1, a system in which the pressure balanced slip bearings are used is shown. A shaker test table assembly indicated generally at 10 is mounted with respect to a suitable support 11, such as a foundation with upright walls 12 forming a peripheral enclosure of substantial mass, and with the ability to stand very high forces occasioned when the shaker table is operated. The side walls 12 are vertical, as shown, and are used for positioning guide and stop members, and the end walls 12 are used for mounting suitable horizontal hydraulic actuators illustrated generally at 13. The horizontal actuators 13 are shown only schematically, and two are shown for sake of simplicity to actively control the rotation of the table about an axis 14A perpendicular to the plane of the table. However other numbers of such actuators may be used on each end of the table illustrated at 14. These actuators are servo valve controlled actuators programmed to oscillate the table 14 in its longitudinal direction as indicated by the double arrow 15 and to shake or vibrate parts or structures on the table for testing. The actuators 13 are double acting hydraulic cylinders having servo valve controls (not shown), and the extendable and retractable rods 16 of the actuators are connected to suitable brackets 17 at the ends of the table. When the actuators are operated, they are operated in synchronism so that they will cause the desired shaking of the table.

Figure 2:
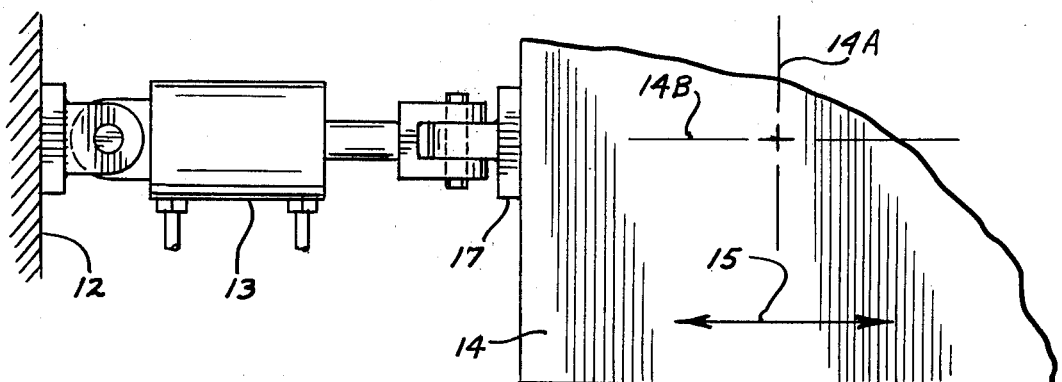
FIG. 2 is a schematic depiction of an end portion of the table showing both horizontal and vertical actuators used with the table of FIG. 1.

The table 14 is supported in its vertical direction through suitable actuators 20 as shown in FIG. 2 that are attached to a base 21 to form part of support 11 and which act to support the table. There are a plurality of the actuators 20 as well to actively control the rotation of the table about the two perpendicular axes 14B and 14C which are in the plane of the table 14, and these actuators also are servo valve controlled, double acting hydraulic cylinders that have rods 22 which are pivotally attached to brackets 23 supporting the table 14. The pivot of brackets 23 and the rods 22 are arranged so that the table may move back and forth as the actuators 13 are operated. The actuators 20 can also be extended and retracted to shake the table in vertical direction, at the same time as the table is shaken in horizontal direction.

Thus, the table 14 is restrained from rotational motion in all three orthogonal axes 14A, B and C and can move back and forth and up and down, but must be guided in its side to side motion. A pressure balanced hydrostatic slip bearing or guide member 25, which as will be explained is a constant displacement guide member, is mounted on one wall 12 and has a hydrostatic bearing surface that slidably engages one side of the table 14. A constant force guide member 26 is mounted directly opposite the guide member 25 to provide compressive preload and also has a hydrostatic bearing surface which slidably engages an opposite side of the table.

Suitable stops or limit bumpers 27 are mounted along the side walls 12 in desired locations and these bumpers 27 include elastomeric end members 28 that will be engaged by the table as the table slews or moves a substantial amount to limit the amount of movement possible and thus prevent damage to the table or excessive indeterminate loads to the bearings 25 and 26.

When the table 14 is to be locked in a position for nonuse, a plurality of air bags illustrated generally at 30 are provided. The air bags are inflated as shown in dotted lines, and serve to lock the table in a rest position when the table is not in use. The air bags can be inflated through suitable pressure mechanisms, and are mounted onto suitable bases 31 that are attached to the side wall 12.

Referring next to FIG. 4, the constant force guide member 26 is shown. The constant force hydrostatic guide member 26 comprises a fluid pressure actuated cylinder that includes a base 34, which is attached to a side wall 12, and the base has a cylindrical opening indicated at 35 into which a piston member 36 is slidably sealingly mounted. A chamber 35A is formed behind the piston member 36. The piston member 36 has a part spherical outer surface as shown (it necks down toward the outer end) to permit some cocking of the cylinder without binding. The piston member 36 is sealed in chamber 35 with a ring 36A backed with an "O" ring 36B. As shown the piston can be retained from separating from the base 34 by the use of cap screw stops 37, and springs 38 are used for initial preload of a hydrostatic bearing perimeter seal, as will be explained. The constant force piston 31 engages the table side under a hydrostatic bearing.

As can be seen, the clearances around the cap screws 37 provide for fluid pressure inside chamber 35A to be supplied to the outer surface of the piston. About six very thin, spaced wear pads 39 are on the outer surface of the piston, and a flat sealing elastomeric annular ring 40A is mounted in a groove in the piston face and is backed by an "O" ring 40B. The ring 40A encompasses the pads 39, and forms a hydrostatic bearing area defined by the area encompassed by the ring 40A. The pressure from chamber 35A is thus sealed within the area defined by ring 40A (and also in area formed by ring 36A on the piston) and forms a compressive loading hydrostatic bearing for the table side.

The "O" ring 36B resiliently backs the sealing ring 36A so that if the table and piston 36 cock slightly, the piston seal will still be maintained. Also "O" ring 40B backs sealing ring 40A for proper sealing. There will thus be little if any loss of oil from the bearing area and consequent loss of bearing support if the piston 36 cocks. The hydrostatic bearing area enclosed within the perimeter of the seal 40A is slightly smaller than the active area of the piston seal 36A so that the not force on the piston 36 holds the seal 40A from leakage.

The bearing pads 39, as explained, are spaced to carry a slight residual compressive load caused by the pressure within the chamber 35A acting upon the differential area between that enclosed by the seal 40A and the piston seal 36A. The springs 38 force the piston 36 and sealing ring 40A outwardly under an initial force to create a seal for the hydrostatic bearing area inside ring 40A during start up of the system so that no excessive fluid loss occurs.

A wiper 40 is provided around the periphery of the seal member 40A to prevent contamination from being swept into the bearing seal 40A.

The constant force is developed by providing suitable pressure from a source of regulated pressure indicated at 41 (suitable control valves are used) through a capillary or orifice 41A to a passageway 42 leading to the chamber 35A and to the underside of the piston 36 to force the piston outwardly toward the table 14 at a desired preload force. An accummulator 41B also is used in the pressure line to augment the stability of the pressure regulator 41.

It should be noted that the interior chamber 35A of the base 34 has a slightly crowned bottom surface, so that when the piston 36 cocks it will not strike the bottom of the cylinder and bind. The hydrostatic bearing seal 36A and backing ring 36B serve to keep the hydrostatic bearing operable even during such cocking of the piston.

The capillary or orifice 41A restricts the flow rate of fluid into the sealed bearing cavity 35A to that necessary to accommodate gradual dimensional shifts due to temperature and static loading of the test table 14.

The capillary or orifice 41A provides additional dynamic stiffness to slip bearing 26 in that it will resist any sudden movements of the piston 36 if the table 14 shifts.

The constant force guide bearing is a hydraulic cylinder having a face provided with a hydrostatic bearing surface to permit sliding movement of the table past the piston. The constant force is provided across the range of movement of the piston under the control of the regulated pressure and the capillary or orifice 40A.

FIG. 3 shows a fluid pressure balanced hydrostatic slip bearing for providing a constant displacement. The slip bearing includes a cylinder base 50 that has a part spherical side wall piston 51 mounted therein inside an interior chamber 52. The piston wall has a seal ring 51A, and a piston chamber 52A is thereby formed on the backside of the piston 51. The piston can be restrained from excessive extension with respect to the base by the use of cap screws 53 slidably extending through openings in the piston and which prevent the piston from over travel. The inner or bottom surface of the chamber 52A is crowned to permit piston 51 to cock a limited number of degrees without binding. Suitable springs 54 provide an initial force for initial sealing of the hydrostatic bearing seal ring as will be explained.

A high pressure source of fluid 55 is open through a needle valve 55A or other suitable orifice to the interior of the piston chamber 52A. The source of pressure provides an approximately constant flow of hydraulic oil to the chamber 52A. In addition the system hydraulic pressure source 55 is connected through a control valve 61 which allows the hydraulic pressure to forcibly extend or permit retraction of the bearing outlet control piston 60. As can be seen, an interior chamber 58 in the piston surrounds a small valve block 59 which is fixed to the base 50. The valve block has a central separate piston member 60 mounted therein. The piston member 60 has an elongated stem and is actuated in outward direction from pressure source 55 and flow controlled by a control valve 61. Thus the system hydraulic pressure source 55 is connected in a manner which allows the hydraulic pressure to forcibly extend or permit retraction of the piston 60. A stem 60A of piston 60 has an interior passageway 62A which has an open end 62 forming a port facing a fixed plate 63 that travels with the piston 51. The space between the end of the stem 60A and plate 63 forms a control bleed orifice drain from the cylinder. When the plate 63 separates from the end of a stem 60A on the piston 60 there is an opening 62 from the interior chamber 58 which is open to chamber 52A into the passageway 62A. (see FIG. 5).

The opening 62 is open through a small passageway that opens to a chamber 62B forming a drain passageway in block 59 in which the piston 60 operates. The chamber 62B is open to a drain conduit 64. Thus any hydraulic oil flowing through the orifice formed by the opening 62 in end of the stem 60A and plate 63 escapes to drain.

It can be seen that the chamber 58 is open to the chamber 52A and thus to the approximately constant flow originating from the valve 55A. The resulting flow from needle valve 55A, which is acting on the underside of the main piston 51, tends to move the bottom of the piston 51 away from the base 50. Eventually, when sufficient oil has flowed from the source 55 through needle valve 55A, the end 62 of passageway 62A would be opened to provide a drain passageway. The flow through the passageway 62A would reach a level so that the force product of the pressure behind the piston 51 multiplied by the area of the piston enclosed within the seal 51A becomes balanced by the force exerted by the table 14 against the assembly 26 to reach a stable condition.

It should also be noted that as the main piston 51 moves away from the base, the pressure from the control valve 61 acting against piston 60 comprises a bias force tending to cause this piston and the attached stem 60A and therefore the port formed by the end of passageway 62 to follow the plate 63, so that the position of piston 51 where an equilibrium is established is when the piston 60 is at its second position at the outer end of the stroke. The piston 60 has a stop located so that the drain passageways 64 and 62B remain open to the chamber 52A when the piston 60 is fully extended. It should be noted that both of the slip bearings are shown retracted, but in operation the table 14 will be centered when pistons 36 and 51 are extended so that some movement of the table in both lateral directions or minor rotation about the yaw axis 14A can be accommodated without bottoming out the pistons.

Spaced low friction pads 69 are also provided on the face of piston 51 for start up and to carry the residual force caused by the start up spring 54 force and the differential area between that enclosed by the seal 51A and that enclosed by the seal ring 70. The flat seal ring 70 is used on the face of piston 51 and seal ring 70 is backed up by an elastomeric ring 71. Seal ring 70 defines a hydrostatic bearing area open to the cylinder for piston 51. The bearing area enclosed by the seal 70 is slightly less than the active piston area enclosed by the seal 51A. The pressure inside the area defined by ring 70 and the resulting compressive force applied to the table 14 will change as the pressure on piston 51 changes to automatically balance the pressure in the bearing area and the pressure acting on piston 51. A suitable wiper 72 can be provided around the periphery of the piston 51 to prevent contamination from being swept into the bearing seal ring 70. The springs 54 provide an initial seal force on ring 70 during start up.

In the design, by way of a specific example, the constant force bearing 25 is provided with hydraulic fluid at 1550 psi, generating a constant force of approximately 100,000 pounds laterally into the table 14. The constant displacement assembly 25 is supplied by system pressure from source 55 which is normally 3100 psi. This is orificed through needle valve 55A so that a flow of approximately two gallons per minute (in the embodiment shown) is provided when the piston 51 is in its reference position with the table centered. SUch a flow will cause a 1550 psi drop in the orifice 55A leaving 1550 psi within the chamber 52A and 52. The normal operating force from the constant displacement slip bearing 25 is thus also 100,000 pounds against the table and equal and opposite the force from the constant force assembly so that the table is in equilibrium. There is a reference or equilibrium flow out the orifice formed by the end of stem 60A and plate 63 when the piston 51 is in its reference position.

If, however, the table is caused for some reason to move away from the base 50 of the constant displacement bearing as previously explained, the internal drain orifice defined by the space between the end of stem 60A and the plate 63 on piston 51 is opened and the flow out of the constant displacement bearing through passageway 62 is then greater than that which can pass through the needle valve 55A and still maintain 1550 psi in the chamber 52. The pressure thus drops inside the constant displacement chamber 52. The constant force bearing assembly 26, which has a higher force than that now developed at bearing 25 by piston 51 pushes the table back toward the constant displacement bearing, closing off the bleed orifice between the stem and piston 51 until the pressure again is raised in the cylinder to cause equilibrium.

If the table moves in a direction toward the constant displacement bearing, the orifice at the end of stem 60A is closed off and the pressure in chamber 52 increases because of the flow through the orifice and needle valve 55A. The resulting force imbalance causes piston 51 to move the table toward the constant force slip bearing until equilibrium that is described above is again reached. It should be noted that the regulated pressure is selected so that in connection with the needle valve 55A, the pressure drop across the needle valve is 1550 psi at the desired bleed flow, causing the table to be in equilibrium. The orifice formed by the stem 60A and the plate 63 permits a constant reference flow of fluid under pressure through the needle valve 55A, into the interior chamber 52A of the base 50, through the chamber 58 and out through the orifice formed by the end of stem 60A and plate 63 to passageway 62.

It should be noted that during normal operation a small amount of the compressive force exerted by the bearing assemblies on the table must be carried by conventional low friction sliding bearing blocks 39 and 69. In addition, a small amount of the normal force is carried by the face seal assemblies 40A and 70. The net friction force resulting from these slider type bearings detracts from the otherwise friction free performance of the remainder of the pressure balanced area. However, the resulting overall coefficients of friction are very low compared to a conventional type slide bearing and backlash is nonexistent in normal operation.

The pressure balanced slip bearing offers the advantage over conventional hydrostatic bearing that it can be operated with considerable internal pressures and with considerable clearance before encountering difficulties with seal extrusion. Thus it can be readily manufactured in very large sizes without having the problems of excessive oil consumption or extra precision manufacturing processes as are required for conventional edge orificed hydrostatic bearings.

The adaption of the pressure balanced slip bearing assemblies to table restraint systems provides for relatively precise control of massive tables. The assemblies shown also may be used in various combinations in other applications where sliding guides are required. It is possible for example to use multiple constant displacement bearings to prevent table rotation about one, two, or even three rotational axis and/or translation in one or two linear axis. In addition, table construction or installation details may alternately require either one or a plurality of constant force slip bearings to provide adequate preload.

What is claimed is:

1. A constant position variable force fluid actuated cylinder having a piston for resisting deviations in position of a member exerting a force on and supported by said piston from a reference position comprising a source of fluid under pressure connected to said cylinder, a variable size drain means permitting reference flow therethrough from said source with said piston in said reference position, means responsive directly to movement of said piston to cause said drain means to change in size in response to changes in position of said piston with respect to said reference position, and means between said source and said cylinder to cause a fluid pressure change between said source of fluid under pressure and said cylinder when the drain means is varied in size by the changing position of the piston; said drain means including a member within said cylinder having a drain passageway therein, said drain passageway opening through an end of said member facing a surface of said directly responsive means, a spacing between said member end and said surface controlling the flow from said cylinder with said piston in said reference postion, said member defining said drain passageway being movably mounted in said cylinder for movement between first and second positions, fluid bias means moving said member toward said second position, said member being in said second position with the piston in the reference position.

* * * * *